(12) United States Patent
Shimizu et al.

(10) Patent No.: US 9,483,874 B2
(45) Date of Patent: Nov. 1, 2016

(54) DISPLAYING PANORAMIC IMAGES IN RELATION TO MAPS

(75) Inventors: Takao Shimizu, Kyoto (JP); Kosei Kitamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 991 days.

(21) Appl. No.: 13/556,701

(22) Filed: Jul. 24, 2012

(65) Prior Publication Data
US 2013/0265386 A1  Oct. 10, 2013

(30) Foreign Application Priority Data

Apr. 9, 2012  (JP) ................................ 2012-088803

(51) Int. Cl.
*G06T 19/00* (2011.01)

(52) U.S. Cl.
CPC ....... *G06T 19/003* (2013.01); *G06T 2219/028* (2013.01)

(58) Field of Classification Search
None
See application file for complete search history.

(56) References Cited

U.S. PATENT DOCUMENTS

| 7,103,232 B2 * | 9/2006 | Kotake et al. | ................ | 382/282 |
| 8,648,871 B2 | 2/2014 | Noge | | |
| 2005/0051623 A1 | 3/2005 | Okuda et al. | | |
| 2009/0237396 A1 | 9/2009 | Venezia et al. | | |
| 2009/0240431 A1 * | 9/2009 | Chau et al. | .................... | 701/208 |
| 2009/0290019 A1 * | 11/2009 | McNelis et al. | .............. | 348/143 |
| 2011/0032252 A1 * | 2/2011 | Ohta | ............................. | 345/419 |

FOREIGN PATENT DOCUMENTS

| JP | 2003-208146 A | 7/2003 |
| JP | 2005-083941 | 3/2005 |
| JP | 2007-065281 A | 3/2007 |
| JP | 2011-258156 A | 12/2011 |

* cited by examiner

*Primary Examiner* — Edward Martello
(74) *Attorney, Agent, or Firm* — Nixon & Vanderhye, P.C.

(57) ABSTRACT

An example non-limiting game apparatus as an information processing apparatus includes a CPU which causes the game apparatus to function as a guide apparatus. A map image of a place or area to be guided is displayed on a lower LCD. When a predetermined position on the map image is designated, a photograph image of a part of a panoramic image produced from a panoramic photograph taken at a real position in a real space that corresponds to the predetermined position is displayed on a stereoscopic LCD. Therefore, not only a planar map image but also an actual photograph at the predetermined position are presented. Furthermore, if the map image is turned, the photograph image of a part of the panoramic image is changed such that the photograph image corresponds to a turned direction.

13 Claims, 12 Drawing Sheets

(A) METHOD OF TAKING PANORAMIC PHOTOGRAPH (B) DIRECTIONS SET ON WHOLE MAP (MAP IMAGE 100)

(A) FIRST DIRECTION BEING DIRECTED TO UP DIRECTION (B) SECOND DIRECTION BEING DIRECTED TO UP DIRECTION (C) THIRD DIRECTION BEING DIRECTED TO UP DIRECTION (D) FOURTH DIRECTION BEING DIRECTED TO UP DIRECTION (A) PHOTOGRAPH IMAGE 200

(B) PANORAMIC IMAGE 100

DISPLAYING PANORAMIC IMAGES IN RELATION TO MAPS

CROSS REFERENCE OF RELATED APPLICATION

The disclosure of Japanese Patent Application No. 2012-88803 filed on Apr. 9, 2012 is incorporated by reference.

FIELD

This application describes an information processing apparatus, a storage medium, and an information processing method and system, displaying a map image.

SUMMARY

It is a primary object of embodiments to provide a novel information processing apparatus, storage medium and information processing method and system.

Furthermore, it is another object of the embodiments to provide an information processing apparatus, storage medium and information processing method and system, capable of presenting intelligible information.

An information processing apparatus of a first embodiment comprises a first displaying portion, a second displaying portion and a display changing portion. The first displaying portion displays a map image. The second displaying portion displays a part of a panoramic image corresponding to a predetermined position. That is, a situation at a real position in a real space corresponding to the predetermined position on the map image is displayed by an image. The display changing portion turns the map image in response to a predetermined input, and changes a part of the panoramic image being displayed by the second displaying portion in correspondence to the turning of the map image.

According to the first embodiment, since a part of a panoramic image at a real position in a real space corresponding to a predetermined position on a map image is displayed, it is possible to know an actual situation at the predetermined position. Furthermore, if the map image is turned, in response thereto, a part of the panoramic image being displayed is changed, and therefore, it is possible to know situations at a current position and around a desired position, and further to easily understand a direction of movement. That is, it is possible to present intelligible information.

A second embodiment is according to the first embodiment, wherein the information processing apparatus further comprises a position designating portion which designates a predetermined position on the map image being displayed by the first displaying portion.

According to the second embodiment, by designating a predetermined position, a part of a panoramic image corresponding to the predetermined position is displayed, and therefore, it is possible to see an image as for a position that a user wants.

A third embodiment is according to the first embodiment, wherein the panoramic image is an image produced based on a panoramic photograph taking a real situation in a real space corresponding to the predetermined position.

According to the third embodiment, since the panoramic image is produced from the panoramic photograph actually taken, it is possible to easily understand situations of surroundings of a position, direction and so on in the real space.

A fourth embodiment is according to the first embodiment, wherein the second displaying portion displays a part of the panoramic image in a case that the predetermined position becomes a viewpoint. For example, the panoramic image is produced from the panoramic photograph taken at a real position in the real space corresponding to the predetermined position.

According to the fourth embodiment, it is possible to see on the panoramic image a situation in a real space with a viewpoint that is the predetermined position on the map.

A fifth embodiment is according to the first embodiment, wherein the display changing portion determines a direction and a distance that a part of the panoramic image displayed on the second displaying portion is changed so as to correspond to a direction and an angle that the map image is to be turned.

According to the fifth embodiment, if a direction of the map image and a position of a panoramic image are brought into correspondence to each other, by turning the map image, the panoramic image of a direction that is curious to see can be seen easily.

A sixth embodiment is according to the first embodiment, wherein the display changing portion turns the map image with an interval of ninety (90) degrees.

According to the sixth embodiment, the map image is turned with an interval of 90 degrees, and therefore, a part of the panoramic image to be displayed in correspondence thereto is also moved by 90 degrees, and accordingly, it is possible to make a panoramic image as for a course and a wall surface for each room, for example, easy to be seen.

A seventh embodiment is according to the first embodiment, wherein the panoramic image is a stereopsis image.

According to the seventh embodiment, because the panoramic image is a stereopsis image, it is possible to present the information that a depth is easy to be understood.

An eighth embodiment is according to the first embodiment, wherein the first displaying portion and the second displaying portion are arranged in a turnable manner. For example, the map image is displayed in a horizontal plane and a part of the panoramic image is displayed in a vertical plane.

According to the eighth embodiment, since displaying directions of the map image and the part of the panoramic image can be made coincident to a direction in the real space, it is possible to provide information more intelligibly.

A ninth embodiment is a storage medium storing an information processing program executable in a computer, wherein the information processing program causes a processor of the computer to function as a first displaying portion displaying a map image on a first display device, a second displaying portion displaying a part of a panoramic image corresponding to a predetermined position on a second display device, and a display changing portion turning the map image in response to a predetermined input, and changing a part of the panoramic image being displayed by the second displaying portion so as to correspond to the turning of the map image.

A tenth embodiment is an information processing method in an information processing apparatus, wherein a processor of the information processing apparatus executes (a) displaying a map image on a first displaying device, (b) displaying a part of panoramic image corresponding to a predetermined position on a second displaying device, and (c) in response to a predetermined input, turning the map image and changing a part of the panoramic image displayed in a step (b) so as to correspond to the turning of the map image.

An eleventh embodiment is an information processing system comprising a first displaying portion which displays a map image, a second displaying portion which displays a part of a panoramic image corresponding to a predetermined position, and a display changing portion which turns the map image in response to a predetermined input, and changes a part of the panoramic image being displayed by the second displaying portion so as to correspond to the turning of the map image.

In each of the ninth embodiment to the eleventh embodiment, as similar to the first embodiment, it is possible to present intelligible information.

The above described objects and other objects, features, aspects and advantages of the embodiments will become more apparent from the following detailed description of the embodiments when taken in conjunction with the accompanying drawings.

DETAILED DESCRIPTION OF NON-LIMITING EXAMPLE EMBODIMENTS

Figure 1:
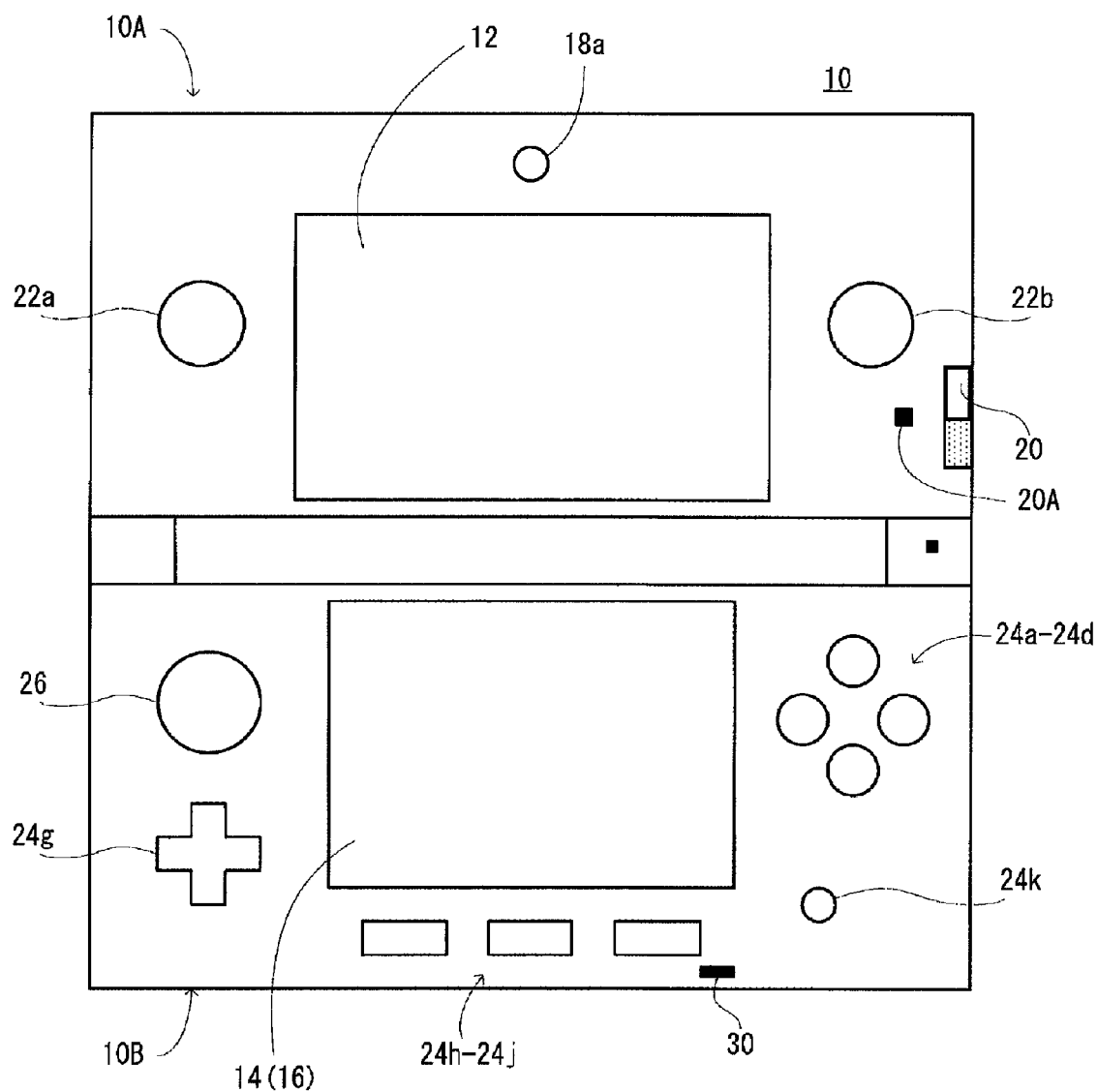
FIG. 1 is an appearance view of an example non-limiting game apparatus.

FIG. 1 shows an appearance of an example non-limiting game apparatus 10. The game apparatus 10 is a game apparatus of a foldable-type, and FIG. 1 shows a front surface of the game apparatus 10 in an opened state.

As shown in FIG. 1, the game apparatus 10 is provided with an upper housing 10A and a lower housing 10B which are turnably or foldably connected to each other, and on a front surface of the upper housing 10A, there are provided with a stereoscopic LCD 12 compliant with an auto-stereoscopic display, an inward camera 18a, a 3D adjusting switch 20, a 3D lump 20A, left and right speakers 22a and 22b and so on. On a front surface of the lower housing 10B, there are provided with a lower LCD 14 with a touch panel 16, A, B, X and Y buttons 24a-24d, a cross key (button) 24g, Home, Select, Start buttons 24h-24j, a power button 24k, an analog pad 26 and a microphone 30. Although not shown, an L button 24e is provided over a left-side surface and a rear surface of the game apparatus 10, and an R button 24f is provided over a right-side surface and the rear surface.

The stereoscopic LCD 12 is a 3D (three-dimensional) LCD according to a parallax barrier system, and displays an image capable of being seen as a stereoscopic image with naked eyes (auto-stereoscopic image). In the stereoscopic LCD 12, it is possible to display a planar image (two-dimensional (2D) image) by turning-off parallax barrier by a barrier LCD. In addition, not limited to the parallax barrier system, a lenticular system utilizing a sheet with concaves/convexes (lenticular lens), and other glassless 3D systems may be adopted.

The inward camera 18a takes a planar image (2D image), and outward cameras 18b and 18c (shown in FIG. 2) take a stereopsis image (3D image). A 2D or 3D image taking a player or user (hereinafter, simply called as "user") can be utilized as an image input to an application program such as information processing program. The 2D image by the inward camera 18a can be also displayed on the lower LCD 14 and the 3D image by the outward cameras 18b and 18c can be displayed on the stereoscopic LCD 12.

The 3D adjusting switch 20 is a slide switch which is for performing manual switching between the 3D and the 2D as to the displaying on the stereoscopic LCD 12, and for performing manual adjustment of three-dimensional effect in the 3D.

In addition, although a detailed description is omitted here, such a change in the three-dimensional effect is implemented through changing a distance between a left and right virtual cameras (not shown) arranged within a virtual space, i.e., a distance D between cameras. That is, in response to an operation of the 3D adjusting switch 20, the distance-between-cameras D adjusted. The distance-between-cameras D is, thus, not only manually adjusted, but subjected to automatic adjustment by the information processing program.

The 3D lump 20A is a lump indicating a displaying state of the stereoscopic LCD 12, which is turned-on at the 3D and turned-off at the 2D. In addition, not only simply turned-on or -off, but also brightness and/or color may be changed according to a degree of the 3D (large or small of the 3D effect).

Operations to the touch panel 16, A, B, X, Y buttons 24a-24d, cross key (button) 24g, Home, Select, Start buttons 24h-24j or the analog pad 26 is utilized as a touch/button/pad inputs in the information processing program. The power button 24k is used for turning-on/off the power of the game apparatus 10. The power lump 42a is turned-on/off in conjunction with the turning-on/off of the power.

The microphone 30 converts the user's speech voice, an environmental sound and so on into sound data. The sound data is utilizable as a sound input in the information processing program. In this case, the information processing program detects the user's speech voice by performing sound recognition, and executes process according to a detection results. The sound data by the microphone 30 is also recordable on a NAND-type flash memory 48 (see FIG. 2).

The speakers 22a and 22b output a sound of music (BGM), a game sound, a microphone sound and so on. A headphone, not shown, is connected to a headphone terminal 36. A sound volume adjusting switch 32 is a slide switch for adjusting a sound volume by the speakers 22a and 22b or an output of the headphone terminal 36.

Figure 2:
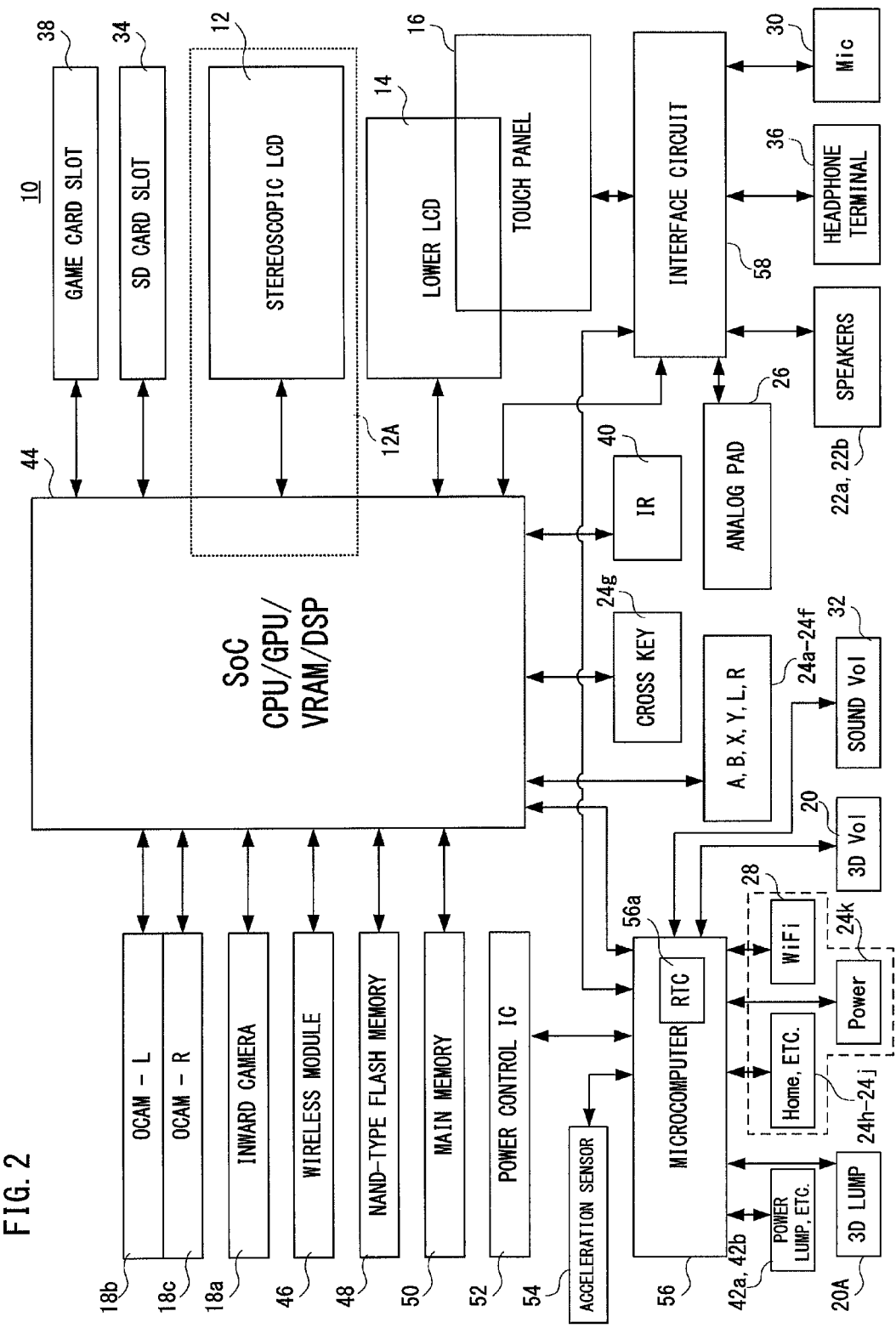
FIG. 2 is a block diagram showing an example non-limiting electrical structure of the game apparatus.

In FIG. 2, the electrical structure of the game apparatus 10 is shown. The game apparatus 10 includes an SoC (System-on a-Chip) 44 being constructed by a CPU, a GPU, a VRAM, a DSP, etc. The SoC 44 is connected with the above-described stereoscopic LCD 12, the lower LCD 14, the inward camera (In camera) 18a, left and right outward cameras (OCAM-L and OCAM-R) 18b and 18c, A, B, X, Y, L, R buttons 24a-24f, the cross button 24g, an SD card slot 34, a game card slot 38 and an infrared ray emitting-receiving unit (IR) 40. The SoC 44 is further connected, via a microcomputer 56, with the above-described 3D adjusting switch (3D Vol) 20, the 3D lump 20A, Home, Select, Start buttons 24h-24j, the power button (Power) 24k, a wireless switch (WiFi) 28, the sound volume adjusting switch (sound volume Vol) 32, and a power, wireless lumps 42a and 42b. The SoC 44 is moreover connected, via an IF circuit 58 with the above-described touch panel 16, the left and right speakers 22a and 22b, the analog pad 26, the microphone (Mic) 30 and the headphone terminal 36.

In addition, the SoC 44 is connected with a wireless module 46, the NAND-type flash memory 48 and a main memory 50 as elements other than those described above. The wireless module 46 has a function connecting to a wireless LAN. Therefore, although not shown, the game apparatus 10 is capable of communicating with other game apparatus 10 and the computer directly or via a network. The NAND-type flash memory 48 stores saving data such as camera images, microphone sounds and so on. The main memory 50 provides a working area to the SoC 44. More specifically, the main memory 50 is stored with various data and programs used in an application (information processing) such as a game, and the SoC 44 performs works with utilizing the data and the programs stored in the main memory 50.

The microcomputer 56 is connected with a power control IC 52 and an acceleration sensor 54. The power control IC 52 performs a power control of the game apparatus 10 and the acceleration sensor 54 detects accelerations of the game apparatus 10 in three-axis directions. A detection result of the acceleration sensor 54 is utilizable as a motion input to the information processing program. In this case, the information processing program calculates a motion of the game apparatus 10 itself based on the detection result, and executes a process according to a calculation result. Furthermore, the microcomputer 56 includes an RTC (real time clock) 56a, and the RTC 56a counts a time to supply to the SoC 44.

Figure 3:
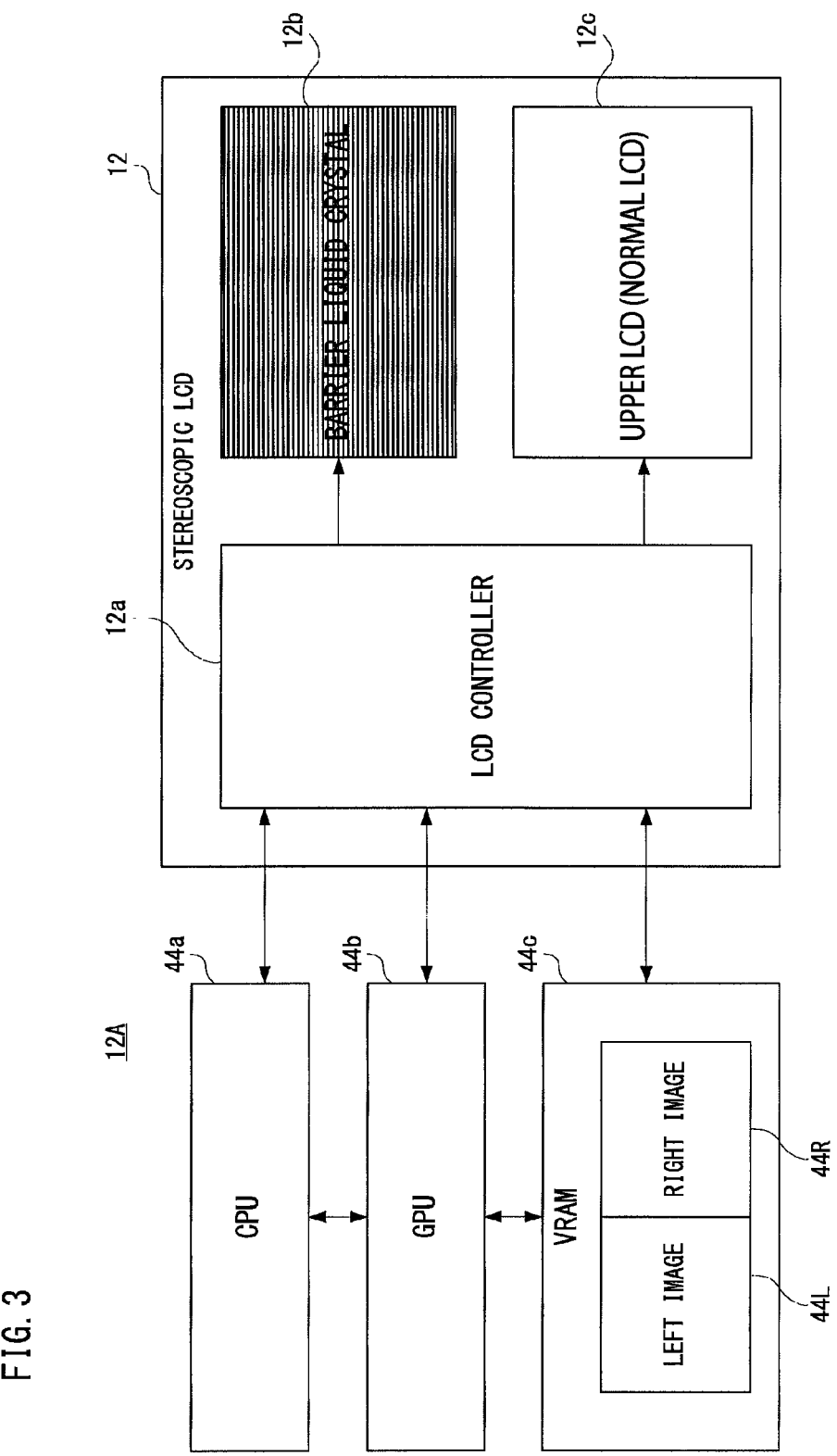
FIG. 3 is a block diagram showing a major portion of the electrical structure in FIG. 2.

In FIG. 3, a stereoscopic LCD control portion 12A constructed by the stereoscopic LCD 12 and a part of the SoC 44 is shown. The stereoscopic LCD 12 includes an LCD controller 12a, a barrier LCD 12b and the upper LCD 12c. The barrier LCD 12b includes a plurality of LCD slits each extending in vertical (column) direction, and by alternately shuttering a light from a backlight by the plurality of LCD slits, the right eye and left eye can see a light passing the pixels in different columns of the upper LCD 12c. The upper LCD 12c may be a normal LCD (for 2D displaying) as similar to the lower LCD 14. The LCD controller 12a performs image rendering on the upper LCD 12c under a control of the GPU 44b and thus the CPU 44a, and turns-on/off a voltage applied to the barrier LCD 12b. If the barrier LCD 12b is turned-off, the right eye and left eye become to see a light passing the pixel in any columns of the upper LCD 12c.

In addition, FIG. 3 shows that the LCD controller 12a, the GPU 44b and the VRAM 44c are provided in relation to the stereoscopic LCD 12, and a LCD controller, a GPU and a VRAM are also provided in relation to the lower LCD 14. As can be understood by reference to FIG. 3, the GPU corresponding to the lower LCD 14 is also connected to the CPU 44a in a manner that a signal can be transmitted and received therebetween, and the GPU and the VRAM both corresponding to the lower LCD 14 are connected to each other in a manner that a signal can be transmitted and received therebetween. Then, the CPU 44a, the GPU and the VRAM each corresponding to the lower LCD 14 are respectively connected to the LCD controller corresponding to the lower LCD 14 in a manner that a signal can be transmitted and received between the LCD controller and each of the CPU 44a, the GPU and the VRAM, and to the LCD controller, the lower LCD 14 is connected.

The above-described game apparatus 10 functions as a guide apparatus that displays a map image within a building and guides to the user a route in the building and exhibition items (exhibition objects) in the building through execution of an example non-limiting information processing program in this embodiment shown. A case that the game apparatus 10 functions as a guide apparatus in the building such as a museum will be described, but it is needless to say that not limited to the museum, the game apparatus 10 is capable of functioning as a guide apparatus for architecture such as an aquarium, a shopping mall, station precinct or other buildings. Not limited to the interior of a house or building, it is possible to function the game apparatus as a guide apparatus as for a predetermined outdoor place such as an event site, a theme park and so on, and as a guide apparatus which performs a guide for buildings and stores in an arbitrary place or area and shows the way.

Figure 4:
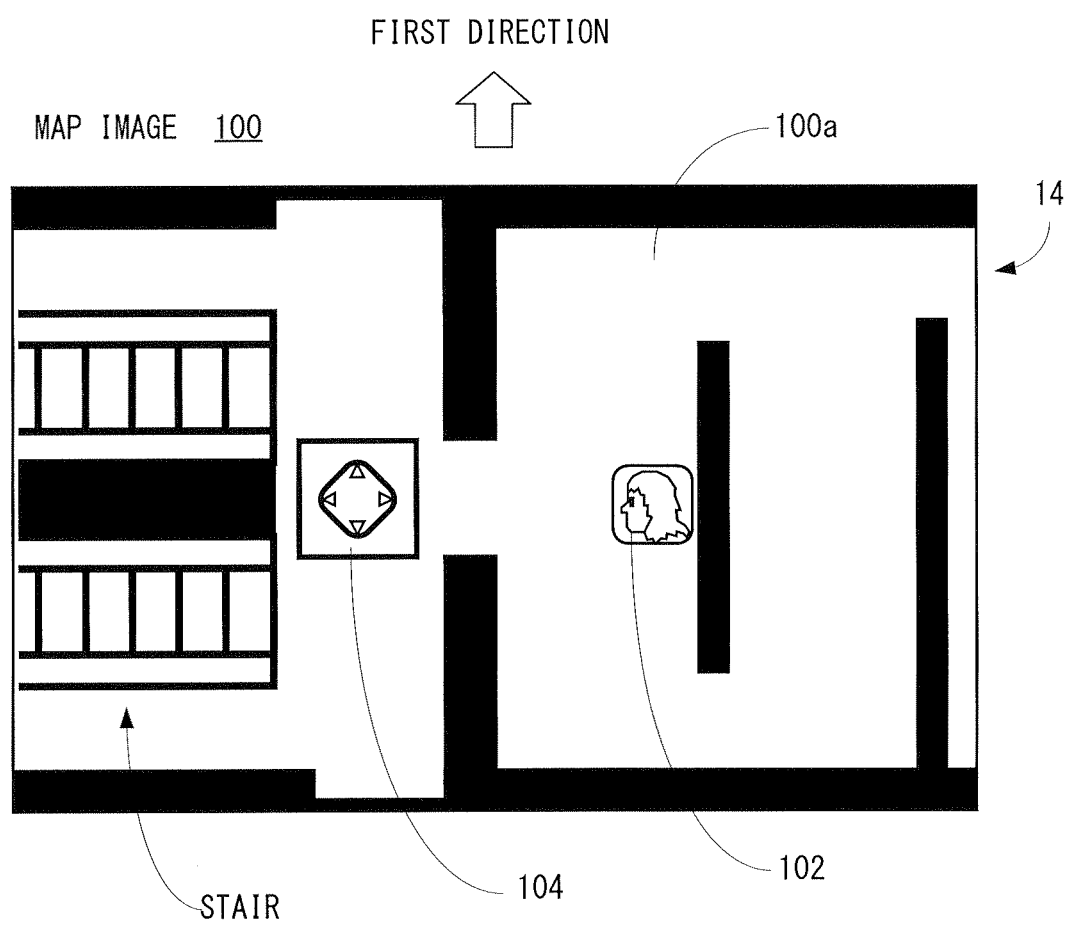
FIG. 4 is an illustrative view showing an example non-limiting map image displayed on a lower LCD in FIG. 1.

FIG. 4 shows an example of a map image 100 displayed on the lower LCD 14 of the game apparatus 10 in a case that the game apparatus 10 functions as a guide apparatus. The map image 100 is generated in virtual space. The map image 100 includes a background image 100a, and further includes an icon image 102 and an icon image 104 both displayed in front of the background image 100a. Since the map image 100 is an image that a partial range of a whole range (a whole map) of a place or area to be guided (herein, museum) is displayed on the lower LCD 14 (see FIG. 6(B)), there is a case that the icon image 102 and the icon image 104 are not displayed dependent upon a displaying range.

The background image 100a is constructed by background objects such as walls, pillars, floors, stairs, toilets which fixedly exist in the place or range to be guided. As shown in FIG. 4, the background image 100a is a two-dimensional image viewing down the place or range to be guided (that is, viewing from above a vertically-down direction). The background image 100a (map image 100) is fixedly set with a two-dimensional coordinate system (XY coordinate system) (see FIG. 6(B)). Because positions of the exhibition objects such as arts (pictures, carvings or the like) and positions displayable a panoramic image showing a real situation within the museum must be surely guided to the user by the icon images (102, 104 and so on) on the map image 100 in the place or range to be guided. For example, a two-dimensional coordinate system is set such that an X-axis direction is oriented East on the map image 100 and a Y-axis direction is oriented North on the map image 100. At a start of guide, it is set that the Y-axis direction of the map image 100 is faced to an up direction on a displaying screen of the lower LCD 14, that is, a direction from a lower end to an upper end.

The icon image 102 is provided to display an image for an exhibition object such as an art. If the icon image 102 is touched (turned-on), an image of an art corresponding to a touched icon is displayed on the stereoscopic LCD 12. In this embodiment shown, the image of the art is an image (a two-dimensional image or three-dimensional image) that the art is drawn or a photograph image taking the art.

The icon image 104 is provided to implement a predetermined function. In this embodiment shown, the predetermined function is a function displaying a panoramic image that is produced by taking a panoramic photograph at an actual (real) position corresponding to a position that the icon image 104 is displayed. In this embodiment shown, a photograph image of a part of the panoramic image according to a direction of the map image 100 being displayed on the lower LCD 14 is displayed on the stereoscopic LCD 12. In addition, in this embodiment shown, it is assumed that the user sees an upper direction in the displaying screen of the lower LCD 14 on the map image 100. In such a case, an image (an image of a part of the panoramic image, in this embodiment) showing a real situation that can be seen in the real space corresponding to the map image 100 is displayed on the stereoscopic LCD 12. That is, on the lower LCD 14, the map image 100 viewing the place or range to be guided from an upper direction toward the vertically down direction is displayed, and on the stereoscopic LCD 12, an image showing a situation in the real space in a case that a depth direction is viewed from the predetermined position (displaying position of the icon image 104) on the map image 100 of the place or range to be guided is displayed. Therefore, in a state that the upper housing 10A and the lower housing 10B is opened at 90 degrees, for example, by holding the game apparatus such that the lower housing 10B (lower LCD 14) becomes in parallel to a horizontal plane in the real space, it is possible to make coincident a displaying direction (depth direction) of the photograph image 200 displayed on the stereoscopic LCD 12 and a displaying direction (horizontal direction) of the map image 100 displayed on the lower LCD 14 with the directions of the real space (three-dimensional direction).

Furthermore, the game apparatus 10 of this embodiment is provided with a function for turning the map image 100. If the map image 100 is turned, in response thereto, a direction that the user is seeing is changed. Therefore, the image showing the situation that can be seen in the real space corresponding to the map image 100 is also changed (renewed).

In addition, in this embodiment, the map image 100 is turned counterclockwise or clockwise at every predetermined angle (90 degrees, for example). Because in the building such as a museum, there are many cases that the passages, walls and so on are intersected to each other at a right angle (90 degrees). For example, the L button 24e is pushed once, the map image 100 is turned by 90 degrees clockwise. If the R button 24f is pushed once, the map image 100 is turned by 90 degrees counterclockwise. It is noted that these are examples only, and other buttons may be used, and the map image 100 may be turned through a touch operation.

Although a detailed description is omitted here, it is possible to enlarge (zoom-in) or reduce (zoom-out) or scroll the map image 100 through a predetermined operation.

Figure 5:
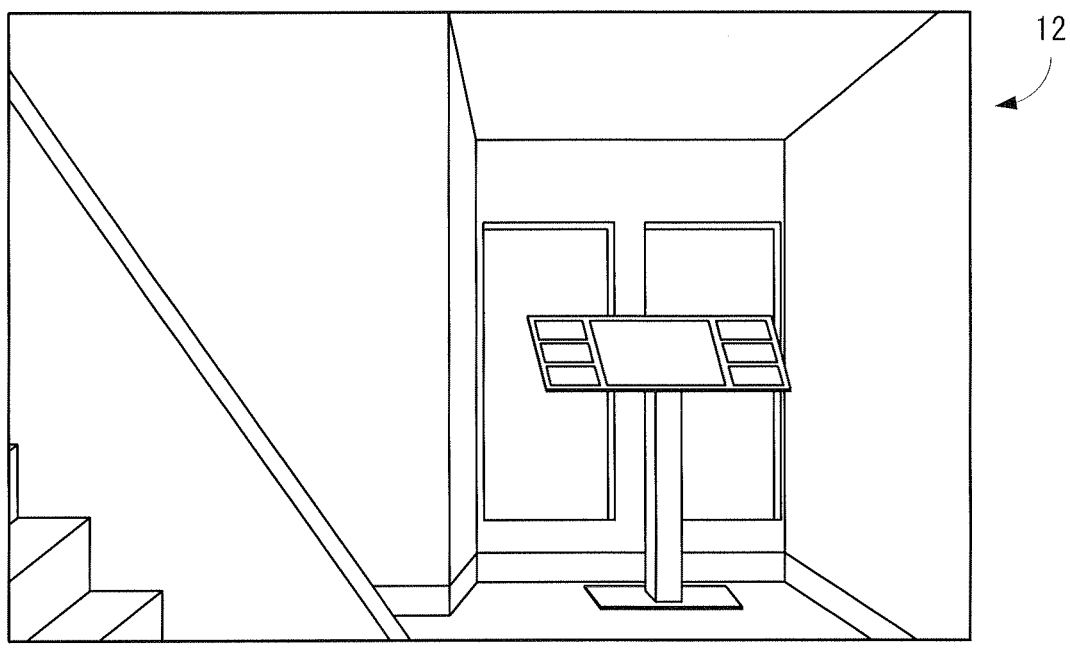
FIG. 5 is an illustrative view showing an example non-limiting photograph image of a part of a panoramic image displayed on a stereoscopic LCD.

In a case that the map image 100 shown in FIG. 4 is being displayed, for example, if and when the icon image 104 is touched, the photograph image as shown in FIG. 5 is displayed on the stereoscopic LCD 12. As described above, the photograph image 200 is a photograph image of a part of a panoramic image produced by taking a panoramic photograph at a position in the real space of the museum corresponding to a position of the icon image 104 on the map image.

Figure 6:
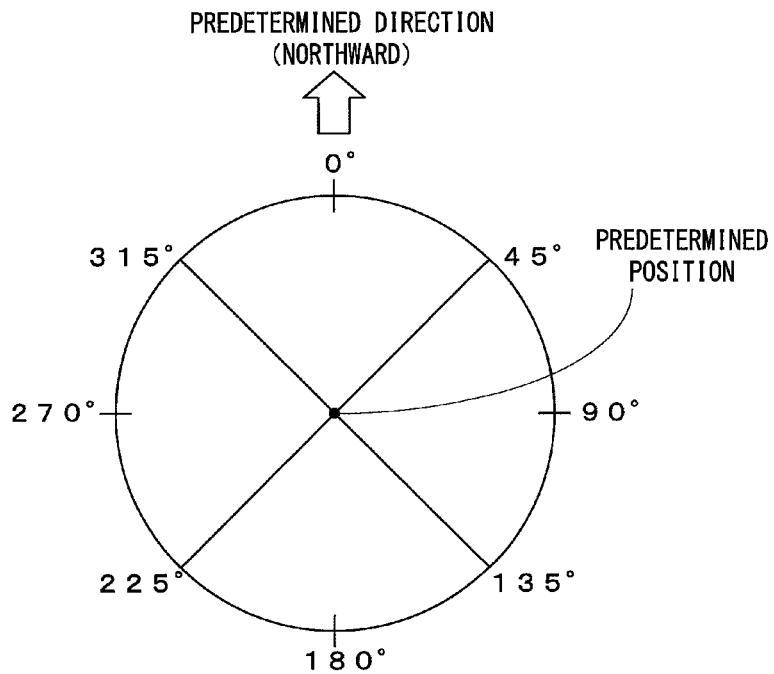
FIG. 6 is an illustrative view showing a taking method of a panoramic photographs and directions set on the map image.
Figure 6:
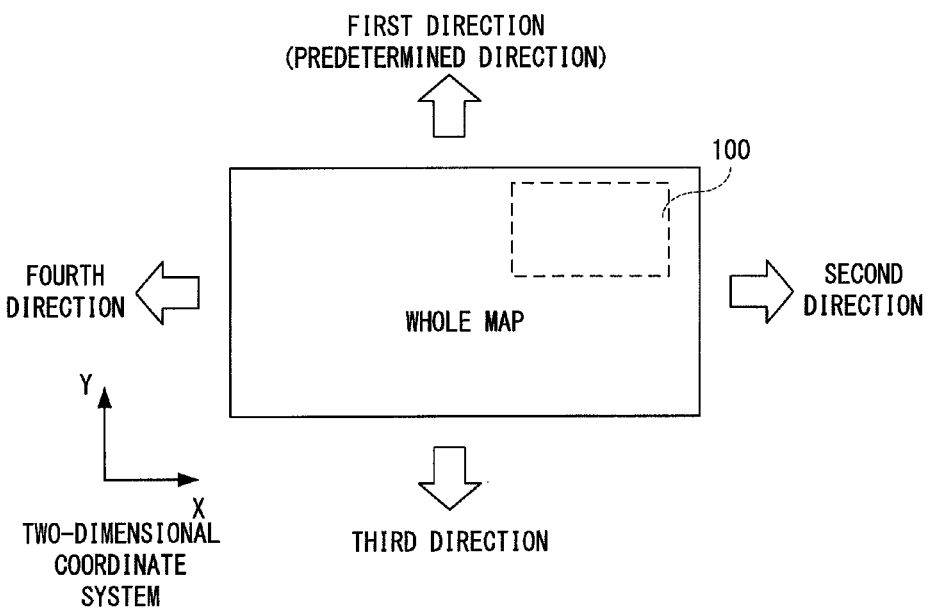

In this embodiment shown, as shown in FIG. 6(A), the panoramic image is produced by taking photographs by a predetermined degrees (30 degrees, 45 degrees or 60 degrees, for example) with a center of a predetermined position within the real space, and by joining a plurality of photograph images thus taken. For example, the panoramic image is a long (belt-like) image from side to side of 360 degrees at the predetermined position in the real space. Furthermore, in this embodiment, in taking the panoramic photograph for producing the panoramic image, the predetermined position (North direction) is made 0 degrees (360 degrees), and a camera for taking a panoramic photograph is turned clockwise. In addition, the predetermined position is a position to be presented to the user in the museum using the panoramic image, and therefore, arbitrarily decided by a developer of the embodiment system or the like. Furthermore, the predetermined position may include a position that becomes a pivotal point for guiding the route, for example, a position that the passage branches, a position at which a means for moving between floors such as a stair or an elevator is provided, and so on.

The panoramic image of 360 degrees can be displayed in this embodiment, but not limited thereto. According to a taking photograph position, i.e. a position that the panoramic image is to be shown to the user, a panoramic image of 180 degrees or 270 degrees, for example, may be displayable.

Furthermore, the photograph image of a part to be displayed of the panoramic image is changed to be linked with the turning of the map image 100. More specifically, in a direction corresponding to a turning direction of the map image 100 at a time that the map image 100 is turned and displayed, a range of a part of the panoramic image to be displayed on the stereoscopic LCD 12 is gradually changed such that the panoramic image is shifted by a distance in accordance with a turning angle. Therefore, directions are set in a whole map or map image 100, and each of the directions is brought into correspondence to an angle (position) of the panoramic image coincident with the set direction. In addition, the angle of the panoramic image means an angle in a case that the predetermined direction is made 0 degree (360 degrees) at a time of taking the panoramic photograph.

As shown in FIG. 6(B), in this embodiment shown, the predetermined direction (Northward) is set as a first direction, and a second direction is set to a direction that the first direction is turned by 90 degrees clockwise (Eastward). Furthermore, a third direction is set in a direction opposite to the predetermined direction (Southward), and a fourth direction is set in a direction that the third direction is turned by 90 degrees clockwise (Westward).

As described above, the predetermined position shown in FIG. 6(A) corresponds to the predetermined position on the map image 100, that is, a displaying position of the icon image 104, and therefore, as can be understood from FIG. 6(A) and FIG. 6(B), a direction of 0 degree at a time of taking photograph agrees with the first direction, a direction of 90 degrees at a time of taking photograph agrees with the second direction, a direction of 180 degrees at a time of taking photograph agrees with the third direction, and a direction of 270 degrees at a time of taking photograph agrees with the fourth direction.

Therefore, the first direction set on the map image 100 is brought into correspondence to a position at 0 degree in the panoramic image, the second direction set on the map image 100 is brought into correspondence to a position at 90 degrees in the panoramic image, the third direction set on the map image 100 is brought into correspondence to a position at 180 degrees in the panoramic image, and the fourth direction set on the map image 100 is brought into correspondence to a position at 270 degrees in the panoramic image.

Figure 7:
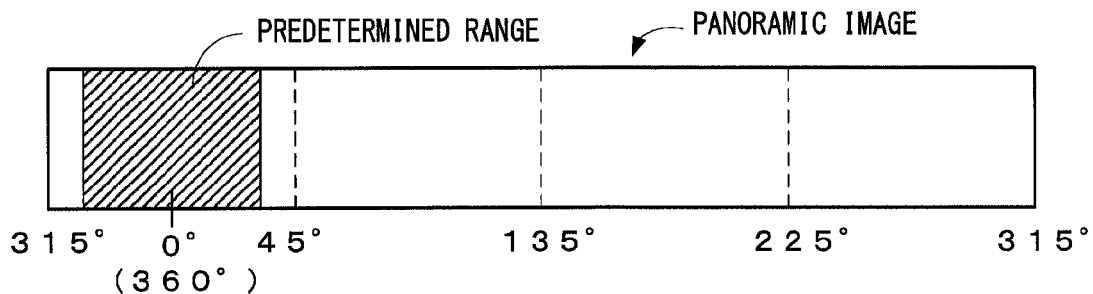
FIG. 7 is an illustrative view showing the photograph image of a part of the panoramic image displayed on the stereoscopic LCD in FIG. 1 in correspondence to a direction of the map image displayed on the lower LCD.
Figure 7:
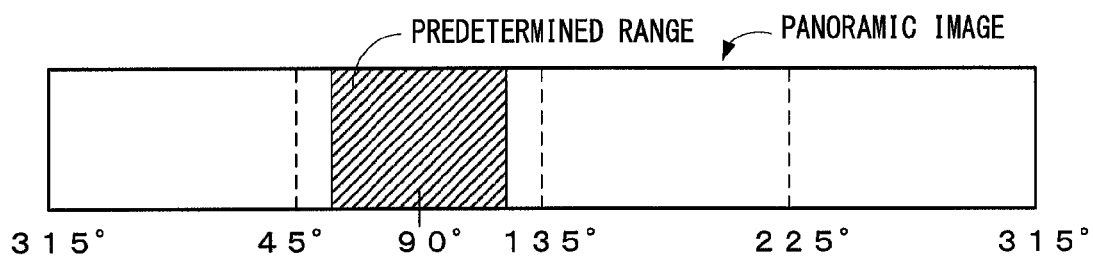
Figure 7:
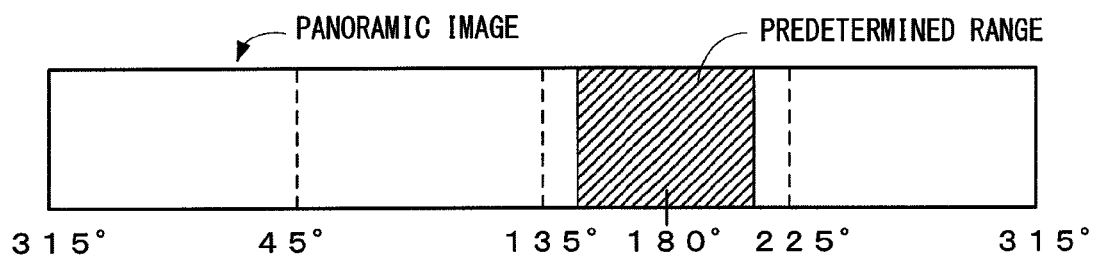
Figure 7:
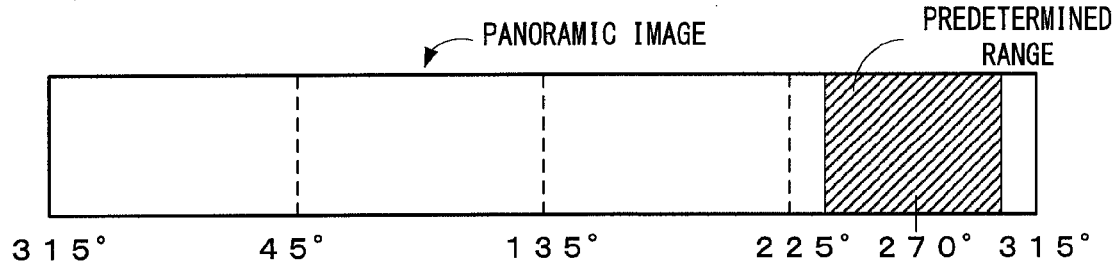

Accordingly, as shown in FIG. 7(A), when the first direction of the map image 100 is oriented to the up direction in the displaying screen of the lower LCD 14, the photograph image 200 of a predetermined range with a center of the position at 0 degree in the panoramic image is displayed on the stereoscopic LCD 12.

In addition, the predetermined range is decided in accordance with a size of the screen of the stereoscopic LCD 12, and in FIGS. 7(A)-7(D), shown by a rectangle frame with slant lines. Furthermore, the data of the panoramic image shown in FIG. 7(A)-FIG. 7(D) is handled on the main memory 50 as ring-like data that left end and right end are continued to each other.

Furthermore, when the second direction of the map image 100 is directed to an up direction in the displaying screen of the lower LCD 14 as shown in FIG. 7(B), the photograph image 200 of the predetermined range with a center of a position at 90 degrees in the panoramic image is displayed on the stereoscopic LCD 12.

If and when the third direction of the map image 100 is directed to the up direction in the displaying screen of the lower LCD 14 as shown in FIG. 7(C), the photograph image 200 of a predetermined range with a center of a position at 180 degrees in the panoramic image is displayed on the stereoscopic LCD 12.

Then, as shown in FIG. 7(D), when the fourth direction of the map image 100 is directed to the up direction in the displaying screen of the lower LCD 14, the photograph image 200 of a predetermined range with a center of a position at 270 degrees of the panoramic image is displayed on the stereoscopic LCD 12.

Furthermore, in this embodiment shown, the photograph image 200 of a part of the panoramic image is changed in conjunction with the turning of the map image 100, and therefore, according to the turning direction and turning angle of the panoramic image 100, a moving direction and a moving amount (angle) of the predetermined range are decided.

For example, in a case that the first direction of the map image 100 is directed to the up direction in the displaying screen of the lower LCD 14, as shown in FIG. 4, if the map image 100 is turned by 90 degrees counterclockwise, the second direction of the map image 100 is directed to the up direction in the displaying screen of the lower LCD 14. In such a case, the predetermined range is moved from a position shown in FIG. 7(A) to a position shown in FIG. 7(B) such that the angle increases. That is, the predetermined range is moved gradually toward the right direction of the panoramic image by a distance corresponding to the angle of 90 degrees.

For example, in a case that the third direction of the map image 100 is directed to the up direction in the displaying screen of the lower LCD 14, if the map image 100 is turned by 90 degrees clockwise, the second direction of the map image 100 is directed to the up direction in the displaying screen of the lower LCD 14. In this case, the predetermined range is moved from a position shown in FIG. 7(C) to a position shown in FIG. 7(B) such that the angle decreases. That is, the predetermined range is moved gradually toward the left direction of the panoramic image by a distance corresponding to the angle of 90 degrees.

Although a detailed description will be omitted here, this is true for other cases. In addition, since the panoramic image is handled in a manner that the left end and the right end thereof are continued to each other as described above, there are cases that the predetermined range is moved toward the left direction of the panoramic image from a position shown in FIG. 7(A) to a position shown in FIG. 7(D) such that the angle decreases, and that the predetermined range is moved toward the right direction of the panoramic image from a position shown in FIG. 7(D) to a position shown in FIG. 7(A) such that the angle increases. In these cases, when the predetermined range strides a position at 0 degree (360 degrees) of the panoramic image, the position of the predetermined range is controlled to be within a range of 0 degree to 360 degrees.

Figure 8:
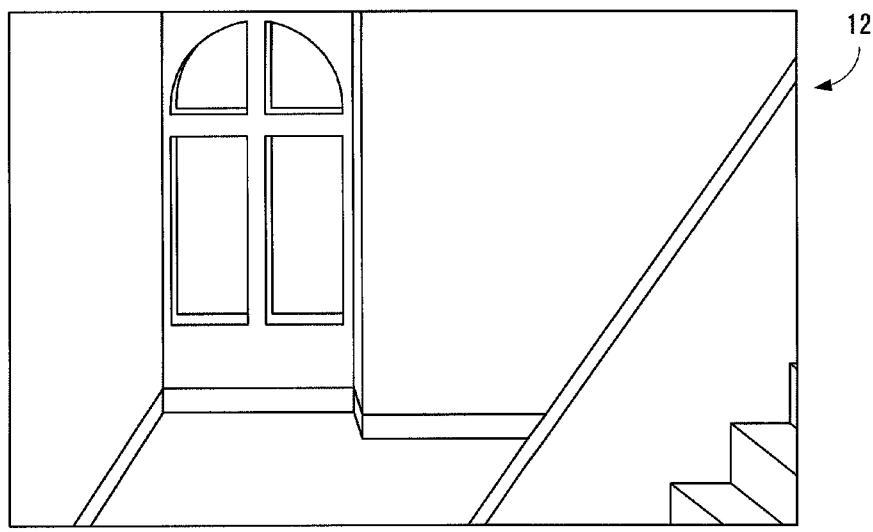
FIG. 8 is an illustrative view showing an example non-limiting other photograph image of a part of panoramic image, and a map image.
Figure 8:
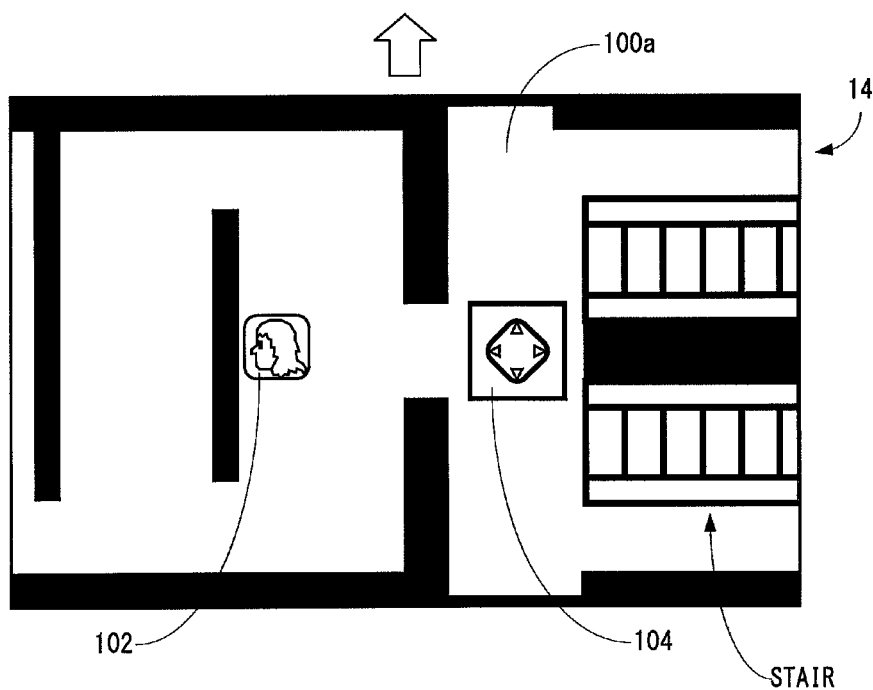

By operating the R button 24$f$ twice or by operating the L button 24$e$ twice, the map image 100 shown in FIG. 4 is turned by 180 degrees clockwise or counterclockwise, and FIG. 8 shows an example of the map image 100 being turned by 180 degrees and an example of the photograph image 200 is displayed at that time.

In addition, by showing the photograph image 200 in FIG. 8(A) and the map image 100 in FIG. 8(B), it is represented that the photograph image 200 and the map image 100 are displayed so as to correspond to each other in the vertical direction in the game apparatus 10.

In this case, since the third direction of the map image 100 is directed to the up direction in the displaying screen of the lower LCD 14 as shown in FIG. 8(B), as shown in FIG. 8(A), the photograph image 200 of a part of the panoramic image of the predetermined range corresponding to this third direction is displayed on the stereoscopic LCD 12.

Although not shown, in a case that the second direction or the fourth direction is directed to the up direction in the displaying screen of the lower LCD 14, the photograph image 200 of a part of the panoramic image of the predetermined range corresponding the second direction or the fourth direction is displayed. For example, in the case that the second direction is directed to the up direction in the displaying screen of the lower LCD 14, the photograph image 200 in which the arts appear in the back between the walls is displayed on the stereoscopic LCD 12. In a case that the fourth direction is directed to the up direction in the displaying screen of the lower LCD 14, the photograph image 200 in which the stair can be seen on a whole screen is displayed on the stereoscopic LCD 12.

It is to be noted that the map images 100 and photograph images 200 shown in FIG. 4, FIG. 5 and FIG. 8 are only examples, and not to be limited thereto.

Furthermore, although not expressed in planer drawings, it is possible to display, in the three-dimensional manner, the images that are the photograph image or the like displayed on the stereoscopic LCD 12.

Figure 9:
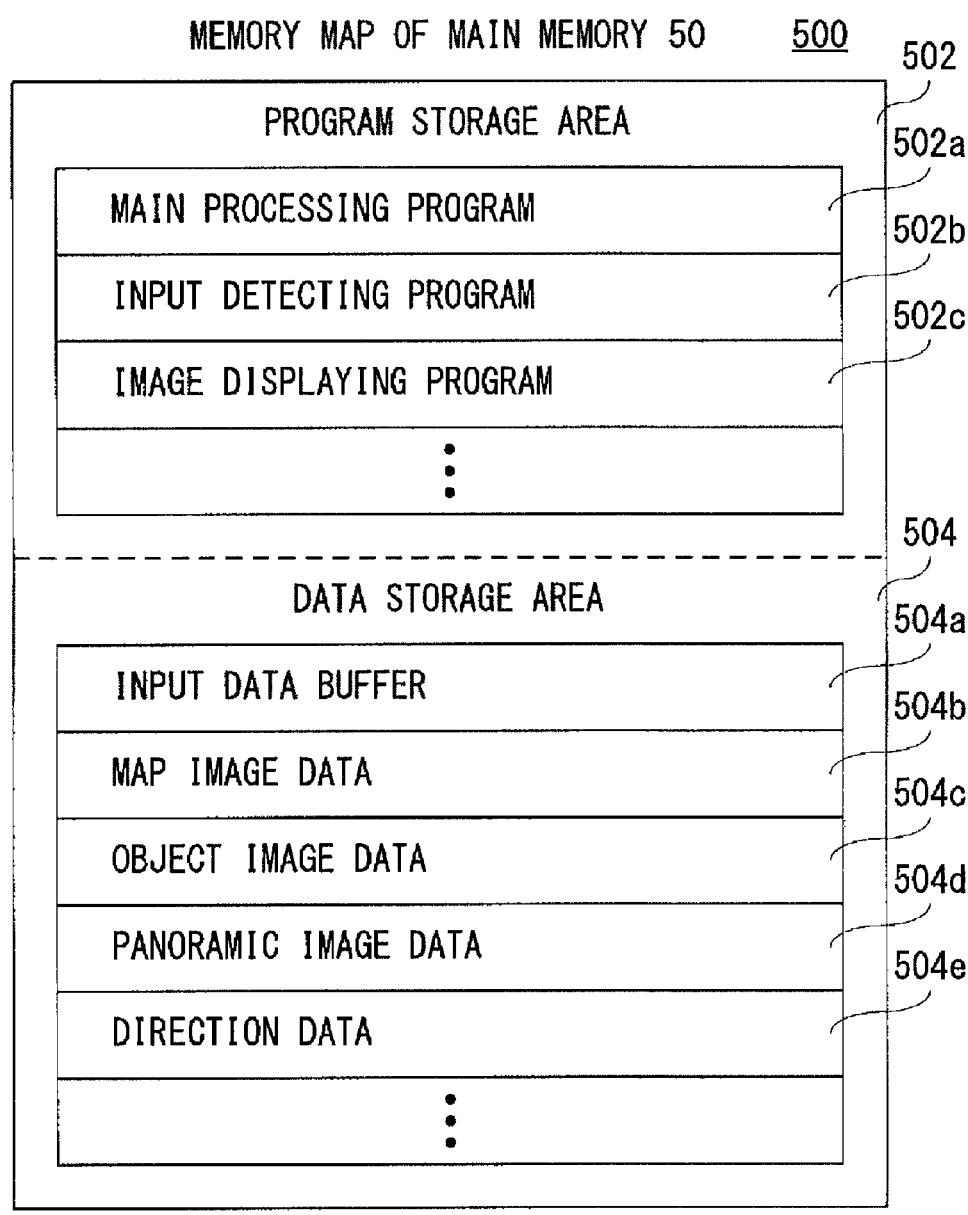
FIG. 9 is an illustrative view showing an example non-limiting memory map of a main memory shown in FIG. 2.

FIG. 9 shows an example of a memory map 500 of the main memory 50 shown in FIG. 2. As shown in FIG. 9, the main memory 50 includes a program storage area 502 and a data storage area 504.

The program storage area 502 stores an information processing program of this embodiment shown, and the information processing program includes a main processing program 502$a$, an input detecting program 502$b$, an image displaying program 502$c$ and so on.

The main processing program 502$a$ is a program for processing a main routine by which a guide for the museum and the arts is executed. The input detecting program 502$b$ is a program for detecting inputs from various buttons or switches (20, 24a-24k, 32), the analog pad 26 and the acceleration sensor 54, and for storing data corresponding to detected inputs (input data) in an input data buffer 504a described later in time series.

The image displaying program 502c is a program for displaying various screens or images (100, 200, etc.) on the stereoscopic LCD 12 and the lower LCD 14 in response to the instructions from the CPU 44a and/or designation by the user, and for renewing such the display.

Although not shown, a sound outputting program and so on are stored in the program storage area 502. Such the sound outputting program is a program for reproducing (outputting)) the music (BGM) and for reproducing (outputting)) the voice guide.

In the data storage area 504, the input data buffer 504a is formed. Furthermore, map image data 504b, object image data 504c, panoramic image data 504d and direction data 504e are stored in the data storage area 504.

The input data buffer 504a temporarily stores the above-described input data. The input data stored temporarily in the input data buffer 504a is erased after the input data is used for a process by the CPU 44a.

The map image data 504b is image data of the map image 100, and the map image data 504b is constructed by data of the background image 100a (background image data) and data of the icon image 102, the icon image 104, etc. (icon image data). As described above, the two-dimensional coordinate system is set to the background image 100a, and the icon images (104, 102 and so on) are set with the coordinates at which the icon images are to be displayed. More specifically, for the icon image 102, the coordinates of the position that the art corresponding to the icon image 102 is exhibited is set, and for the icon image 104, the coordinates of the position that the photograph image of a part of the panoramic image corresponding to the icon image 104 can be displayed is set.

The object image data 504c is image data for respective arts. In this embodiment, the image data (called as "first image data" for convenience of explanation) is data of an image that the art is drawn or a photograph image taking the art. Furthermore, each first image data is brought into correspondence to the icon image 102 that is displayed at the position of the map image 100 corresponding to the position at which each art shown by the first image data is exhibited.

The panoramic image data 504d is image data of respective panoramic images. In this embodiment, the image data (called as "second image data" for convenience of explanation) is data of the panoramic image at a predetermined position within the museum. Therefore, for each predetermined position, the data of corresponding panoramic image is stored. As described above, in each second image data, the directions set in the map image 100 (first direction, second direction, third direction and fourth direction) are brought into correspondence to predetermined positions of the panoramic image (0 degree, 90 degrees, 180 degrees and 270 degrees). Furthermore, each second image data is brought into correspondence to the icon image 104 that is displayed at a position of the map image 100 corresponding to the predetermined position taking the panoramic photograph to produce the panoramic image.

The direction data 504e is data indicating that which direction out of the first direction to fourth direction set on the map image 100 (a whole map) is directed to the up direction in the displaying screen of the lower LCD 14. In this embodiment, the map image 100 is turned by a unit of 90 degrees, and therefore, the direction data 504e is constructed by a two-bit register. For example, if a value of the register is "00", it is indicated that the first direction of the map image 100 is directed to the up direction in the displaying screen of the lower LCD 14. If the value of the register is "01", it is indicated that the second direction of the map image 100 is directed to the up direction in the displaying screen of the lower LCD 14. If the value of the register is "10", it is indicated that the third direction of the map image 100 is directed to the up direction in the displaying screen of the lower LCD 14. If the value of the register is "11", it is indicated that the fourth direction of the map image 100 is directed to the up direction in the displaying screen of the lower LCD 14.

Although not shown, in the data storage area 504, other data necessary for execution of the information processing program is stored, and a counter (timer) and a flag are also provided.

Figure 10:
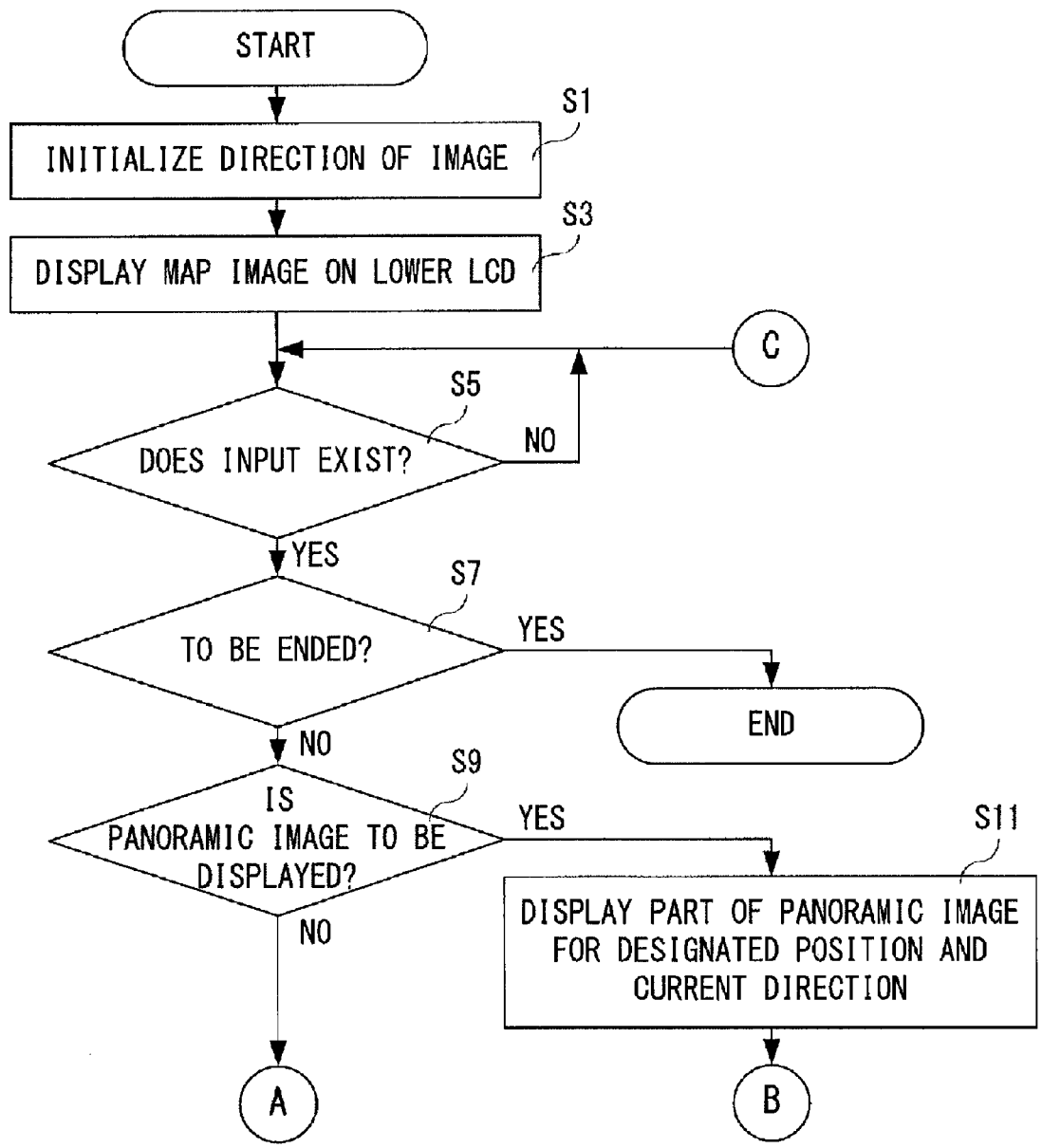
FIG. 10 is a flowchart showing a part of an example non-limiting image displaying process by a CPU shown in FIG. 2 and FIG. 3.
Figure 11:
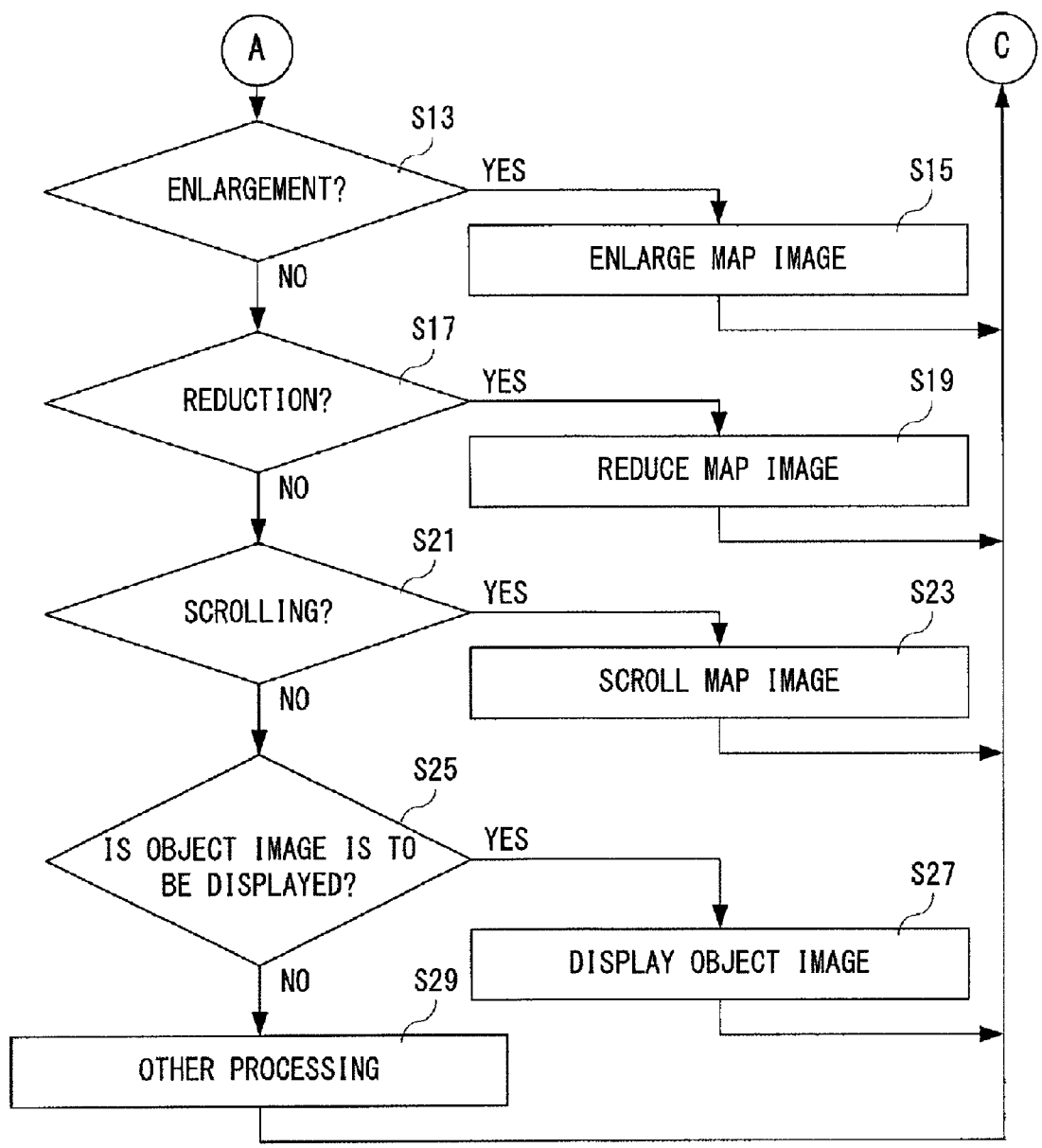
FIG. 11 is a flowchart succeeding to FIG. 10 and showing another part of an example non-limiting image displaying process by the CPU shown in FIG. 2 and FIG. 3.
Figure 12:
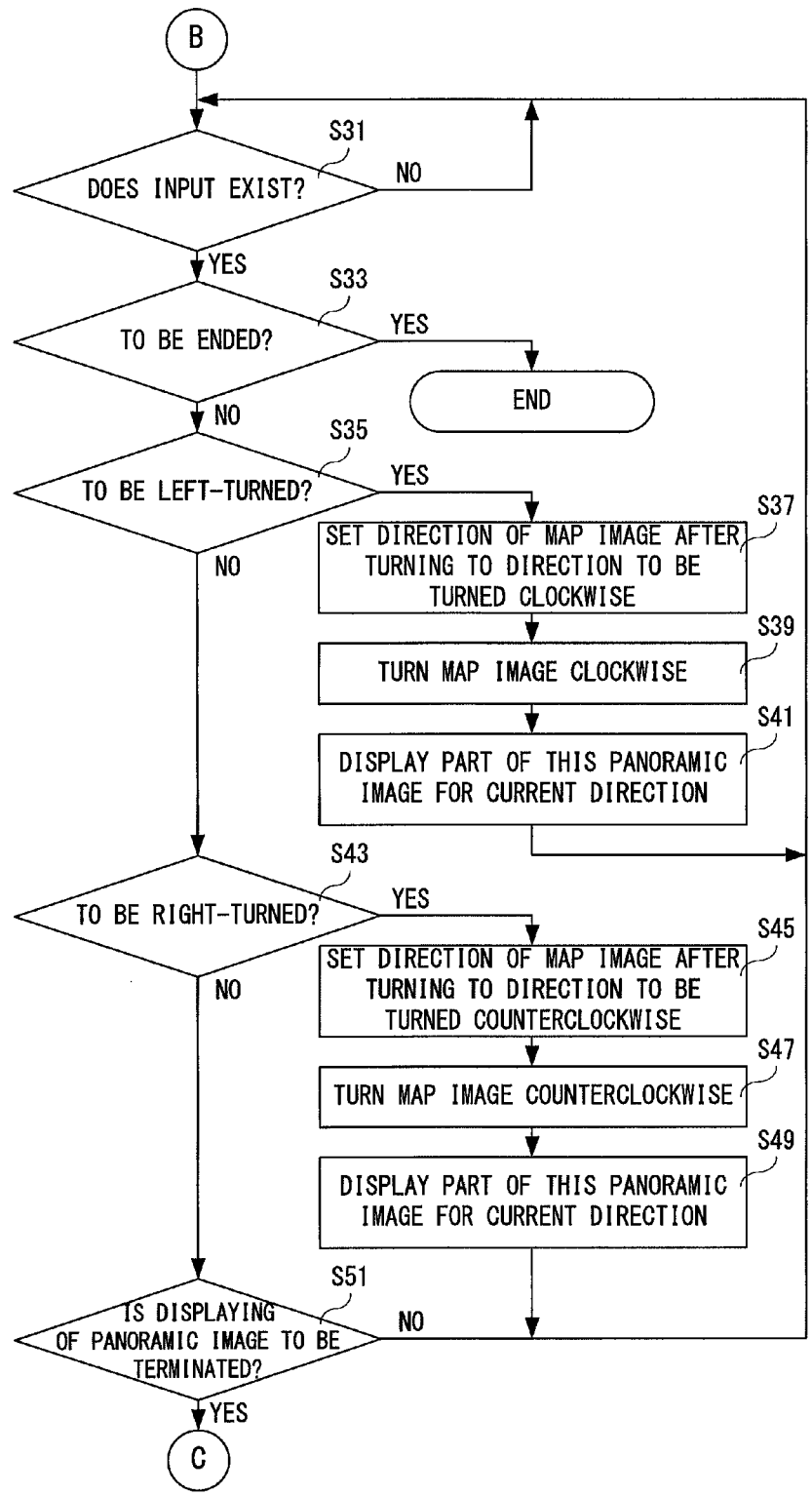
FIG. 12 is a flowchart further succeeding to FIG. 10 and showing other part of an example non-limiting image displaying process by the CPU shown in FIG. 2 and FIG. 3.

FIG. 10 to FIG. 12 are flowcharts showing an image displaying process of the CPU 44 shown in FIG. 2 and FIG. 3. The image displaying process is started as shown in FIG. 10, in a step S1, a direction of an image is initialized. That is, the CPU 44a sets a data value "00" in the register constituting the direction data 504e.

In a next step S3, the map image 100 is displayed on the lower LCD 14. In this step, the map image 100 being determined in advance may be displayed, or the map image 100 at a place that the user designates may be displayed; however, the map image 100 is displayed on the lower LCD 14 such that the first direction set on the map image 100 is directed to the up direction in the displaying screen of the lower LCD 14.

In a succeeding step S5, it is determined whether or not an input exists. That is, the CPU 44a determines whether or not the input data is stored in the input data buffer 504a.

If "NO" is determined in the step S5, that is, if no input exists, the process returns to the step S5 with no action. On the other hand, if "YES" is determined in the step S5, that is, if an input exists, in a step S7, it is determined whether or not the process is to be ended. In the step S7, the CPU 44a determines whether or not the input data indicates an end of the process.

If "YES" is determined in the step S7, that is, if to be ended, the image displaying process is terminated. On the other hand, if "NO" is determined in the step S7, that is, if not to be ended, it is determined whether or not the panoramic image is to be displayed in a step S9. That is, the CPU 44a determines whether or not the touch position indicated by the input data is on the icon image 104. That is, it is determined whether or not the icon image 104 is touched. Hereinafter, this is true for a case that it is determined whether or not the icon image (102, 104) is touched.

If "YES" is determined in the step S9, that is, if the panoramic image is to be displayed, in a step S11, a part of the panoramic image according to a designated position and a current direction is displayed, and then proceeding to a step S31 shown in FIG. 12. That is, in the step S11, the CPU 44a displays a photograph image of a part to which a current direction is brought into correspondence out of the panoramic images stored in correspondence to the icon image 104. The current direction is the direction of the map image (first direction, second direction, third direction or fourth direction) that is directed to the up direction in the displaying screen of the lower LCD 14.

On the other hand, if "NO" is determined in the step S9, that is, if the panoramic image is not to be displayed, in a step S13 shown in FIG. 11, it is determined whether or not the map image 100 is to be enlarged. Although not shown, the CPU 44*a* determines, based on the input data, whether or not an icon image for enlargement is touched or a button or key indicating the enlargement is operated.

If "YES" is determined in the step S13, that is, if to be enlarged, in a step S15, the map image 100 is enlarged, and the process returns to the step S5 shown in FIG. 10. For example, the CPU 44*a* in the steps S15 makes a virtual camera (not shown) taking the map image 100 zoom-in.

On the other hand, if "NO" is determined in the step S13, that is, if not to be enlarged, in a step S17, it is determined whether or not the map image 100 is to be reduced. Although not shown, for example, the CPU 44*a* determines, based on the input data, whether or not an icon image for reduction is touched or a button or key indicating the reduction is operated.

If "YES" is determined in the step S17, that is, if to be reduced, in a step S19, the map image 100 is reduced, and then returned to the step S5. For example, in the step S19, the CPU 44*a* makes the virtual camera taking the map image 100 zoom-out.

On the other hand, if "NO" is determined in the step S17, that is, if not to be reduced, in a step S21, it is determined whether or not the map image 100 is to be scrolled. Although not shown, for example, the CPU 44*a* determines, based on the input data, whether or not the coordinates of the touch position is changed by more than a predetermined distance within a predetermined time period. That is, it is determined whether or not a slide operation is made.

If "YES" is determined in the step S21, that is, if to be scrolled, in a step S23, the map image 100 is scrolled, and then the process returns to the step S5. In the step S23, for example, the CPU 44*a* moves the virtual camera taking the map image 100 in a direction opposite to a direction of the slide operation and by a distance according to a distance of the slide operation (moving amount).

On the other hand, if "NO" is determined in the step S21, that is, if not to be scrolled, in a step S25, it is determined whether or not the object image is to be displayed. That is, in this step, the CPU 44*a* determines, based on the input data, whether or not the icon image 102 is touched.

If "YES" is determined in the step S25, that is, if the object image is to be displayed, in a step S27, the object image of the object image data stored in correspondence to the icon image 102 being touched is displayed on the stereoscopic LCD 12, and then the process returns to the step S5.

On the other hand, if "NO" is determined in the step S25, that is, if the object image is not to be displayed, in a step S29, other processing is executed, and returned to the step S5. As other processing, there is an adjustment of the sound volume or an adjustment of the three-dimensional effect, for example.

As described above, if the displaying of the panoramic image is designated, and the photograph image of a part of the corresponding panoramic image is displayed in the step S11, as shown in FIG. 12, in the step S31, it is determined whether or not an input exists. The processing in this step is the same or similar to the processing in the previous step S5.

If "NO" is determined in the step S31, that is, if no input exists, the process returns to the same step S31. On the other hand, if "YES" is determined in the step S31, that is, if an input exists, in a step S33, it is determined whether or not the process is to be ended. This processing is the same or similar to the processing in the previous step S7.

If "YES" is determined in the step S33, that is, if to be ended, the image displaying process is terminated with no action. On the other hand, if "NO" is determined in the step S33, that is, if not to be ended, in a step S35, it is determined whether or not a left turn is to be performed. In this step, the CPU 44*a* determines whether or not the L button 24*e* is depressed on the basis of the input data.

If "YES" is determined in the step S35, that is, if the L button 24 is depressed, in a step S37, a direction of the map image 100 after turning is set in a direction turned by 90 degrees clockwise from the current direction. That is, the data value of the register constituting the direction data 504*e* is decremented by 1; however, if the data value is "00", the data value "11" is set.

In a step S39, the map image 100 is turned by 90 degrees clockwise. That is, the CPU 44*a* turns the virtual camera by 90 degrees counterclockwise. Then, in a step S41, the photograph image 200 of a part of this panoramic image in the current direction is displayed on the stereoscopic LCD 12, and the process returns to the step S31. It is to be noted that "this panoramic image" means the panoramic image that is designated to be displayed in the steps S9 and S11. The same is applied hereinafter. Furthermore, since the map image 100 is turned clockwise, in the step S41, the CPU 44*a* changes (slides) the displaying range (predetermined range) of the photograph image to be moved by 90 degrees in the left direction such that the photograph image of a part of the panoramic image corresponding to the direction shown by the direction data 504*e* is displayed. Therefore, the photograph image displayed on the stereoscopic LCD 12 is changed as in a manner that a through image or a video image taken at a time that a digital camera or a video camera is panned by 90 degrees in the left direction. If "NO" is determined in the step S35, that is, if not to be left-turned, in a step S43, it is determined whether or not a right turn is to be made. In this step, the CPU 44*a* determines, based on the input data, whether or not the R button 24*f* is depressed.

If "YES" is determined in the step S43, that is, if the right turn is determined, in a step S45, the direction of the map image 100 after turning is set in a direction turned by 90 degrees counterclockwise from the current direction. That is, the data value of the register constituting the direction data 504*e* is incremented by 1; however, if the data value is "11", the data value "00" is set.

In a next step S47, the map image 100 is turned by 90 degrees counterclockwise. In this step, the CPU 44*a* turns the virtual camera by 90 degrees clockwise. Then, in a step S49, the photograph image 200 of a part of this panoramic image in the current direction is displayed on the stereoscopic LCD 12, and the process returns to the step S31. Since the map image 100 is turned counterclockwise, in the step S49, the CPU 44*a* changes (slides) the displaying range (predetermined range) of the photograph image to be moved by 90 degrees in the right direction such that the photograph image of a part of the panoramic image corresponding to the direction shown by the direction data 504*e* is displayed. Therefore, the photograph image to be displayed on the stereoscopic LCD 12 is changed as in a manner that a through image or a video image taken at a time a digital camera or a video camera is panned by 90 degrees in the right direction.

If "NO" is determined in the step S43, that is, if not to be right-turned, in a step S51, it is determined whether or not displaying of the panoramic image is to be ended. In this step, the CPU 44*a* determines whether or not the icon image 104 is touched based on the input data. If "NO" is determined in the step S51, that is, if the displaying of the panoramic image is not to be ended, the process returns to the step S31 with no action. On the other hand, if "YES" is determined in the step S51, that is, if the displaying of the panoramic image is to be ended, the process returns to the step S5 shown in FIG. 10.

According to the embodiments, if the icon image which is displayed at the predetermined position on the map image is touched, since the photograph image of a part of the panoramic image that is stored in correspondence to the map image and shows a real situation in the real space is displayed, by seeing the photograph image, it is possible to know from the photograph image the situation surrounding the current position of the user, a proceeding direction or situation surrounding a desired position. That is, it is possible to present the intelligible information.

Furthermore, according to the embodiments, since the photograph image of a part of the panoramic image is changed in conjunction with the turning of the map image, it is possible to omit works that the game apparatus on which the map image and the photograph image of a part of the panoramic image are displayed is turned, or that the user himself/herself turns.

Furthermore, according to the embodiments, since the direction set in the map image and the position (angle) of the panoramic image correspond to each other, by turning the map image, it is possible to easily display the photograph image of a part of the panoramic image in a direction that the user wants to see. That is, it is possible to easily see a desired photograph image.

In addition, in the embodiments, although the turning angle of the map image and moving amount (angle) of the panoramic image are set as 90 degrees, not limited thereto. In a case more precise guide is to be implemented, these may be set as 30 degrees, 45 degrees or 60 degrees. On the other hand, a rough guide is to be implemented, these may be set as 120 degrees or 180 degrees.

In the embodiments, the directions are set on the whole map or the map image, and the position of the panoramic image corresponding to each of the directions is set, and then, the turning of the map image and the changing of the photograph image of a part of the panoramic image (movement of the predetermined range) are controlled, but not limited thereto. It is possible to consider that a single reference direction is set on the map image, and the position of the panoramic image corresponding the reference position is set, and then, the moving direction and moving amount of the predetermined range in the panoramic image are decided in correspondence to the turning direction and the turning angle of the map image.

That is, if the direction set on the map image and the position of the panoramic image are made correspondent to each other, it is possible to turn the map image with an arbitrary angle and display the photograph image of a part of the panoramic image corresponding to the turning of the map image.

In the embodiments, the panoramic image is displayed in response to the touch (turn-on) of the icon image, but not limited thereto. For example, the panoramic image may be displayed in response to that the position on the displayable map image of the panoramic image is displayed on the lower LCD.

In the embodiments, the map image displayed on the lower LCD is turned with a center that is a center of the map image being displayed, but the map image may be turned with a center at a displaying position of the icon image for displaying the panoramic image. If the map image is turned with a center that is the displaying position of the icon image, it is possible for a user to see the situation that is a scene at a time that the user himself/herself turns at a predetermined position within the real space by panoramic image.

The structure of the game apparatus is not to be limited to these shown in the embodiments. For example, the touch panel may not be provided. Furthermore, two touch panels are provided on the two LCDs, respectively.

While certain example system, method, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing apparatus, comprising:
a first displaying portion which displays a map image;
a second displaying portion which displays a part of a panoramic image corresponding to a predetermined position; and
a display changing portion which turns the map image in response to a predetermined input, and changes a part of the panoramic image being displayed by the second displaying portion in correspondence to turning of the map image.

2. An information processing apparatus according to claim 1, further comprising a position designating portion which designates a predetermined position on the map image being displayed by the first displaying portion.

3. An information processing apparatus according to claim 1, wherein the panoramic image is an image produced based on a panoramic photograph taking a real situation in a real space corresponding to the predetermined position.

4. An information processing apparatus according to claim 1, wherein the second displaying portion displays a part of the panoramic image in a case that the predetermined position becomes a viewpoint.

5. An information processing apparatus according to claim 1, wherein the display changing portion determines a direction and a distance by which the part of the panoramic image displayed on the second displaying portion is to be changed so as to correspond to a direction and an angle that the map image is to be turned in response to receiving the predetermined input.

6. An information processing apparatus according to claim 1, wherein the display changing portion, in response to receiving the predetermined input, turns the map image with an interval of ninety degrees.

7. An information processing apparatus according to claim 1, wherein the panoramic image is a stereopsis image.

8. An information processing apparatus according to claim 1, wherein the first displaying portion and the second displaying portion are arranged in a turnable manner.

9. An information processing apparatus according to claim 1, wherein the first displaying portion is configured to display the map image as a two dimensional image, and wherein the second displaying portion is configured to display the part of the panoramic image as a three dimensional image.

10. An information processing apparatus according to claim 1, wherein the part of the panoramic image is displayed without overlapping with the displayed map image.

11. A non-transitory storage medium storing an information processing program executable in a computer, wherein the information processing program causes a processor of the computer to function as:

a first displaying portion displaying a map image on a first display device;

a second displaying portion displaying a part of a panoramic image corresponding to a predetermined position on a second display device; and a display changing portion turning the map image in response to a predetermined input, and changing a part of the panoramic image being displayed by the second displaying portion so as to correspond to the turning of the map image.

12. An information processing method in an information processing apparatus, wherein a processor of the information processing apparatus executes:

(a) displaying a map image on a first displaying device;

(b) displaying a part of panoramic image corresponding to a predetermined position on a second displaying device; and (c) in response to a predetermined input, turning the map image and changing a part of the panoramic image displayed in a step (b) so as to correspond to the turning of the map image.

13. An information processing system, comprising:

a first displaying portion which displays a map image;

a second displaying portion which displays a part of a panoramic image corresponding to a predetermined position; and a display changing portion which turns the map image in response to a predetermined input, and changes a part of the panoramic image being displayed by the second displaying portion so as to correspond to the turning of the map image.

* * * * *